US008005016B2

(12) United States Patent
Chiabaut et al.

(10) Patent No.: US 8,005,016 B2
(45) Date of Patent: Aug. 23, 2011

(54) PROVIDER LINK STATE BRIDGING (PLSB) COMPUTATION METHOD

(75) Inventors: Jerome Chiabaut, Ottawa (CA); David Allan, Ottawa (CA); Nigel Bragg, Weston Colville (GB)

(73) Assignee: Nortel Networks Limited, St. Lurent (CA)

( * ) Notice: Subject to any disclaimer, the term of this patent is extended or adjusted under 35 U.S.C. 154(b) by 15 days.

(21) Appl. No.: 12/259,650

(22) Filed: Oct. 28, 2008

(65) Prior Publication Data
US 2010/0103846 A1 Apr. 29, 2010

(51) Int. Cl.
*H04L 12/28* (2006.01)
(52) U.S. Cl. ........................................ 370/254
(58) Field of Classification Search .............. 370/254, 370/401, 395, 255, 390, 389, 238, 400, 256, 370/237, 252, 351, 352, 463, 356; 709/242, 709/227, 226, 225, 229, 238, 239, 224, 232, 709/235; 455/461, 522, 67, 523
See application file for complete search history.

(56) References Cited

U.S. PATENT DOCUMENTS

| | | | | |
|---|---|---|---|---|
| 4,912,656 A | * | 3/1990 | Cain et al. | 709/242 |
| 6,330,605 B1 | * | 12/2001 | Christensen et al. | 709/226 |
| 2003/0026268 A1 | * | 2/2003 | Navas | 370/400 |
| 2006/0285526 A1 | * | 12/2006 | Jang et al. | 370/338 |
| 2007/0036178 A1 | * | 2/2007 | Hares et al. | 370/490 |
| 2007/0086361 A1 | | 4/2007 | Allan et al. | |
| 2007/0165657 A1 | | 7/2007 | Smith et al. | |
| 2008/0144644 A1 | | 6/2008 | Allan et al. | |
| 2009/0109870 A1 | * | 4/2009 | Metke et al. | 370/254 |

FOREIGN PATENT DOCUMENTS

| | | |
|---|---|---|
| EP | 1455510 A2 | 9/2004 |
| GB | 2422508 A | 7/2006 |

OTHER PUBLICATIONS

U.S. Appl. No. 11/964,478, filed Dec. 26, 2007, Inventors: Jerome Chaibaut, David Allan and Nigel Bragg, Title: Tie-Breaking in Shortest Path Determination, 26 pages of specification/claims/abstract and 8 pages of drawings.

* cited by examiner

*Primary Examiner* — Pankaj Kumar
*Assistant Examiner* — Prenell P Jones
(74) *Attorney, Agent, or Firm* — Pearne & Gordon LLP

(57) ABSTRACT

A method of multicast route computation in a link state protocol controlled network. A spanning tree is computed from a first node to every other node in the network using a known spanning tree protocol. The network is then divided into two or more partitions, each partition encompassing an immediate neighbor node of the first node and any nodes of the network subtending the neighbor node on the spanning tree. Two or more of the partitions are merged when a predetermined criterion is satisfied. Nodes within all of the partitions except a largest one of the partitions are then identified, and each identified node examined to identify node pairs for which a respective shortest path traverses the first node.

16 Claims, 4 Drawing Sheets

PROVIDER LINK STATE BRIDGING (PLSB) COMPUTATION METHOD

CROSS-REFERENCE TO RELATED APPLICATIONS

This is the first application filed for the present invention.

MICROFICHE APPENDIX

Not Applicable.

TECHNICAL FIELD

The present invention relates to traffic forwarding in packet networks, and in particular to a Provider Link State Bridging (PLSB) computation method.

BACKGROUND OF THE INVENTION

Network operators and carriers are deploying packet-switched communications networks in place of circuit-switched networks. In packet-switched networks such as Internet Protocol (IP) networks, IP packets are routed according to routing state stored at each IP router in the network. Similarly, in Ethernet networks, Ethernet frames are forwarded according to forwarding state stored at each Ethernet switch in the network. The present invention applies to communications networks employing any Protocol Data Unit (PDU) based network and in this document, the terms "packet" and "packet-switched network", "routing", "frame" and "frame-based network", "forwarding" and cognate terms are intended to cover any PDUs, communications networks using PDUs and the selective transmission of PDUs from network node to network node.

Multicast forwarding of data packets (where packets are sent from a source node to multiple destination nodes more or less simultaneously) is of increasing importance as demand for services such as Internet Protocol Television (IPTV) and Video on Demand (VoD) grows.

Protocols such as Intermediate System-Intermediate System (IS-IS) and Open Shortest Path First (OSPF) and Multicast OSPF are used to distribute topology information to permit distributed calculation of paths that interconnect multiple nodes, resulting in the installation of the forwarding state required to implement those paths. OSPF and IS-IS are run in a distributed manner across nodes of the network so that, for example, when a topology change occurs in the network such as a node or link failure, this information is flooded to all nodes by the protocol's operation, and each node will locally recompute paths to circumvent the failure based on a consistent view of the network topology.

In Ethernet networks, Provider Backbone Transport (PBT), also known as Provider Back-Bone Bridging-Traffic Engineering (PBB-TE), as described in Applicant's British patent number GB 2422508 is used to provide a unicast Ethernet transport technology. Provider Link State Bridging (PLSB) as described in Applicant's co-pending U.S. patent application Ser. No. 11/537,775 will be used to provide a multicast transport capability for Ethernet networks using IS-IS to set up both unicast paths and multicast trees in the network. Both above patent documents are hereby incorporated by reference.

While the present invention is not limited to the application of a routing system to Ethernet bridging, Ethernet terminology is used in this disclosure where possible. So, for example, the term filtering database (FDB) can be considered interchangeable with any term for an information repository of packet forwarding information, such as forwarding information base or label information base.

Typically, multicast trees in a PLSB network are computed using an all-pairs shortest path multicast route computation algorithm known, for example, from Applicant's co-pending U.S. Patent Application Publication No. 20070165657. In accordance with this method, when a node receives either a multicast group membership change or a network topology change (for example via a Link State Protocol Data Unit—LSP) the node employs algorithms such as Dijkstra's algorithm to compute both unicast connectivity and the set of pairs of network nodes that are connected by a shortest path which traverses the computing node. For that set of node pairs, the node determines where intersections of multicast group membership occur, and defines the required FDB entries to instantiate its portion of multicast paths accordingly. Both Unicast and Multicast forwarding state implementing the computed paths is then installed in the node's filtering database (FDB), so that received packets can be forwarded to the appropriate output port(s) of the node, based on the destination address in the frame.

As may be appreciated, identifying pairs of nodes for which the respective shortest path traverses a particular node is computationally intensive, because it involves examining the paths extending from each node to every other node. In some cases, the challenge of performing the required computations within an acceptable period of time can impose limitations on the size of the network. Clearly, more powerful processors can be used to increase the speed of computation, but only by increasing the cost of each node, which may be undesirable.

Techniques for improving the efficiency of multicast route computation in packet switched networks remain highly desirable.

SUMMARY OF THE INVENTION

Thus, an aspect of the present invention provides a method of multicast route computation in a link state protocol controlled network. A spanning tree is computed from a first node to every other node in the network using a known spanning tree protocol. The network is then divided into two or more partitions, each partition encompassing an immediate neighbour node of the first node and any nodes of the network subtending the neighbour node on the spanning tree. Two or more of the partitions are merged when a predetermined criterion is satisfied. Nodes within all of the partitions except a largest one of the partitions are then identified, and each identified node is examined to identify node pairs for which a respective shortest path traverses the first node.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a PLSB computation method in which the number of nodes that must be examined, in order to find all of the node pairs for which the respective shortest path traverses a given node, is minimized. In some cases, the number of nodes that must be examined can be reduced to zero. Embodiments of the invention are described below, by way of example only, with reference to FIGS. 1-2e.

As an initial matter, it should be noted that the method of the present invention is valid for networks in which computed shortest paths are symmetric (that is, the network can be represented as an undirected graph) and, if two or more equal-cost paths can be computed between any two nodes, a tie-breaking method must be implemented which will select one of the equal-cost paths in such a way that the selected "shortest" paths are symmetric and locally consistent. In this respect, "locally consistent" means that any sub-path of the equal-cost path selected by the tie-breaking method must itself be a shortest path selected by the tie-breaking method. A representative tie-breaking method, which may be used in conjunction with the methods of the present invention, is known from Applicant's co-pending U.S. patent application Ser. No. 11/964,478, which was filed on Dec. 26, 2007.

Figure 1:
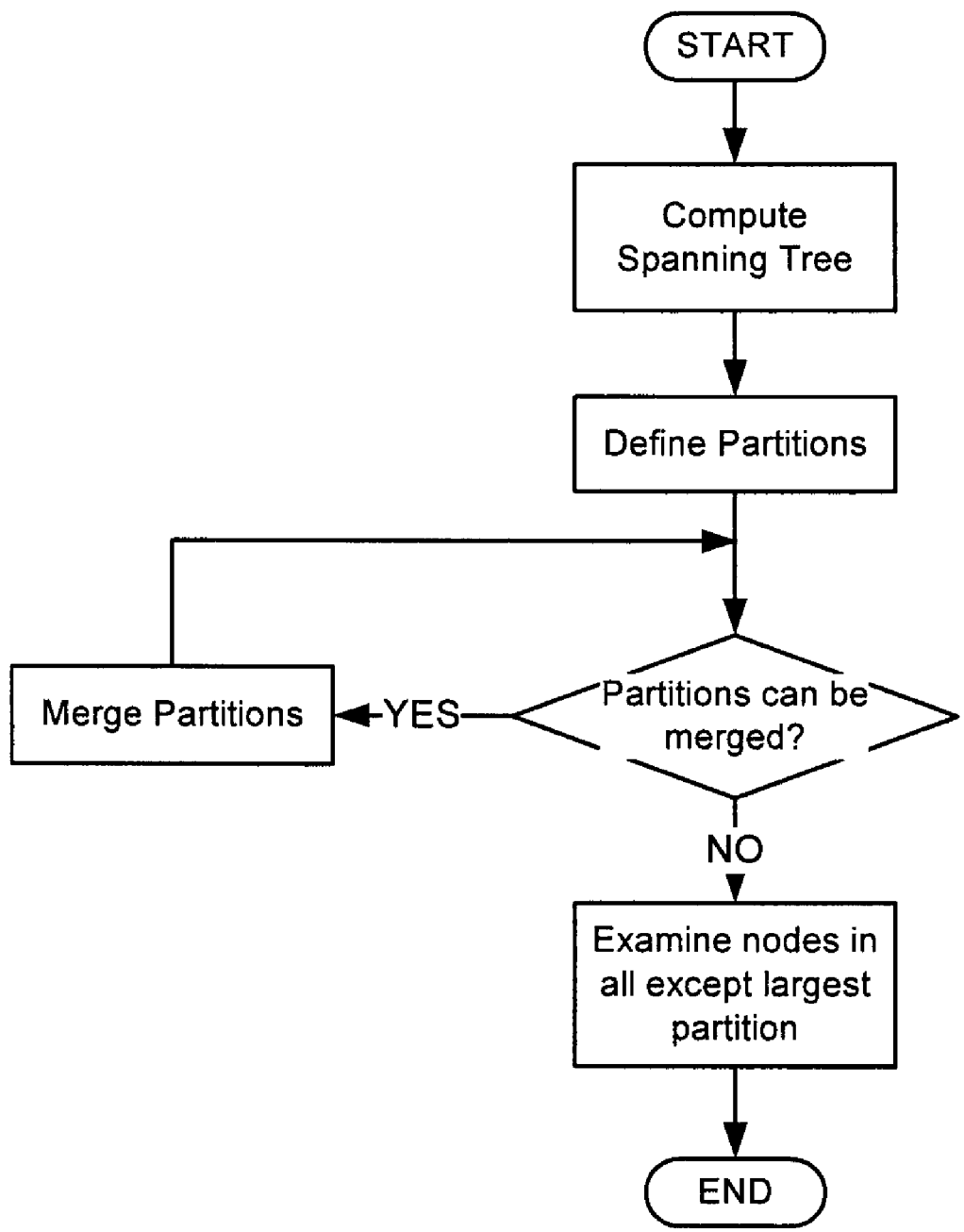
FIG. 1 is a flow chart illustrating principle steps in a method according to a representative embodiment of the present invention.

FIG. 1 is a flow chart illustrating principle steps in a method according to a representative embodiment of the present invention, and FIGS. 2a-e illustrate steps in the process of FIG. 1 implemented in a representative network.

Figure 2A:
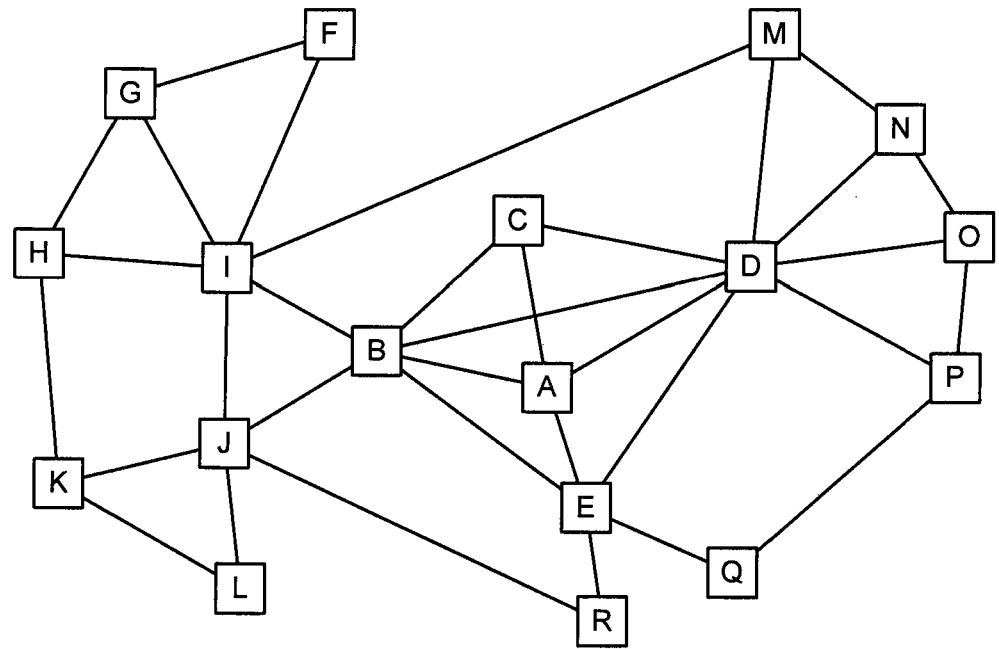
FIGS. 2a-e illustrate steps in the process of FIG. 1 implemented in a representative network.

Referring first to FIG. 2a, a representative PLSB network comprises a plurality of nodes (labelled as nodes A-R) interconnected by links. As is typical in a PLSB network, every node in the network of FIGS. 2a-e is connected to at least two other nodes, although this is not essential. Preferably, the method of the present invention will be implemented to execute in every node, substantially in parallel. In the following description, the method is described by way of an example in which shortest paths traversing node "A" are identified.

Figure 2B:
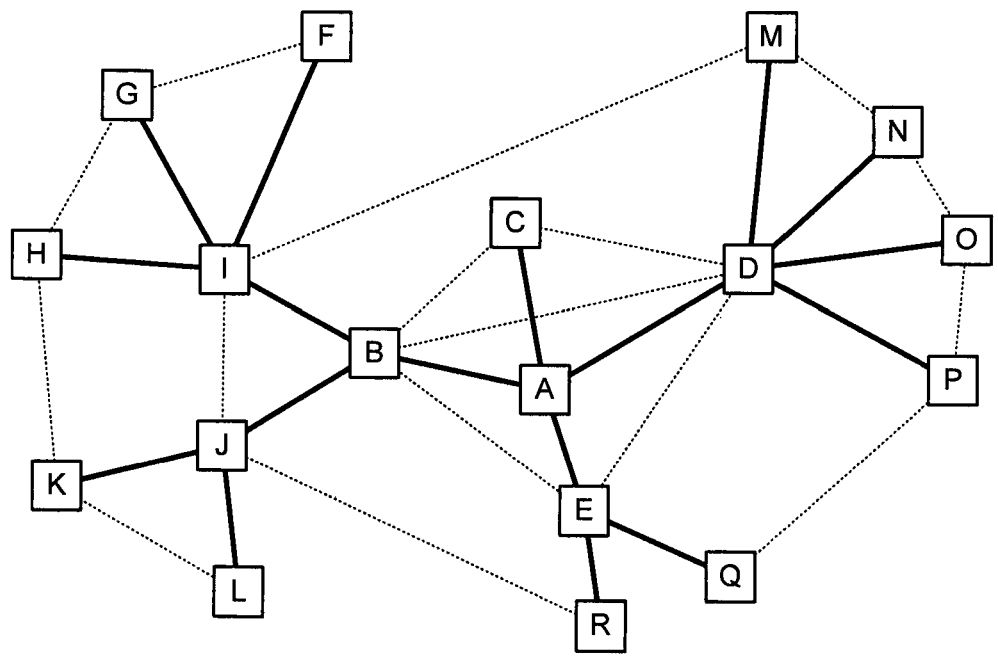

Referring now to FIGS. 1 and 2b, at a first step, a spanning tree from node "A" to every other node in the network is computed, for example using a known shortest path tree algorithm such as Dijkstra's algorithm. As may be seen in FIG. 2b, the spanning tree (indicated by bold lines in FIGS. 2b-e) comprises a plurality of branches extending from node "A" to each of its immediate neighbours (nodes B, C, D and E). By construction, all of the nodes of the network are on one of these branches. Thus it is possible to notionally divide the network into a set of partitions, each of which encompasses a respective branch of the spanning tree.

By construction, each partition will therefore include a respective one of the neighbour nodes, and all of the nodes that subtend that neighbour node on the spanning tree. For convenience of description, each branch/partition may be referenced using the identifier of the respective neighbour node which serves as the root of that branch. Thus, in FIG. 2c, the four partitions are identified as partitions "B", "C", "D" and "E", following the identity of their respective root nodes.

Figure 2C:
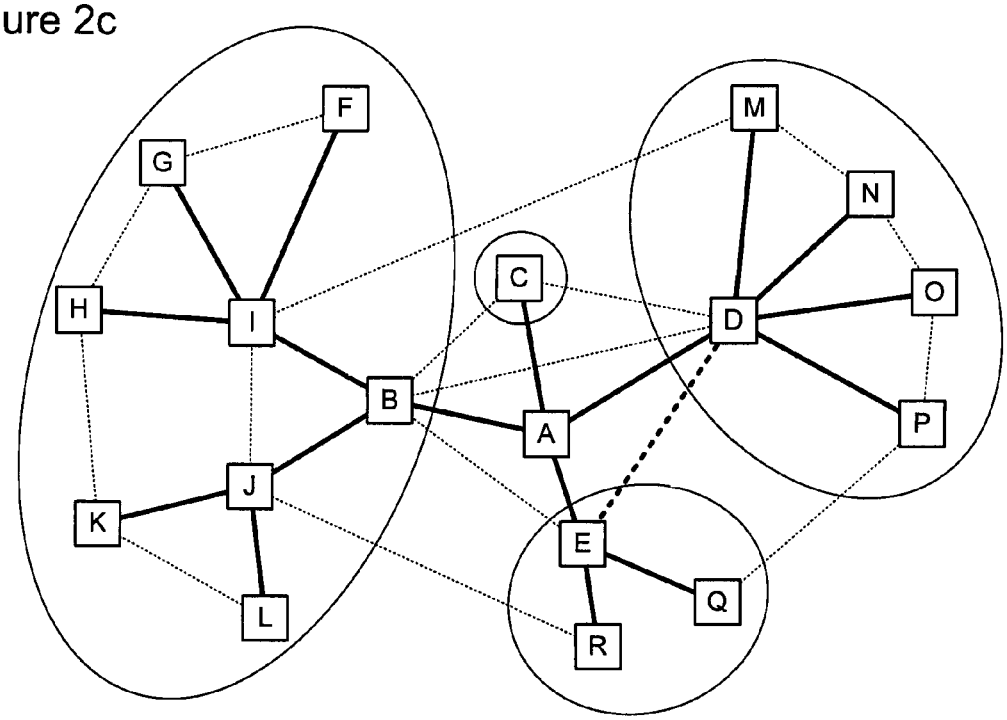

As may be seen from FIG. 2c, any shortest path that traverses node "A" must necessarily originate in one partition and terminate in a second partition. Because of path symmetry between node pairs, the number of nodes that need to be examined, in order to find all of the node pairs for which the respective shortest path traverses node "A", can be reduced by considering the nodes in all but one of the partitions. The benefits of this reduction can be maximized by recognising that the largest partition, in terms of the number of member nodes, can be selected as the omitted partition, so that only paths terminating at nodes in the remaining smaller partitions are considered.

A further reduction in the number of nodes that must be examined can be obtained by recognising that the shortest path between any node in one partition and any node in any other partition will not traverse node "A" if, and only if, there is a path between the respective root nodes of the involved partitions that is shorter than the two-hop path through node "A". For example, consider a path between nodes M and R in the embodiment of FIG. 2, which are respectively located in partitions "D" and "E". In this example we will only consider number of hops as the shortest path criterion although other criteria are equally applicable. Inspection of the network reveals that the root nodes "D" and "E" are directly connected by a link. Consequently, the shortest path between nodes M and R traverses only root nodes "D" and "E", and does not traverse node "A". Consideration of the other nodes in partitions "D" and "E" reveals that, while not all of the shortest paths (between a node in partition "D" and a node in partition "E") traverse the direct link between root nodes "D" and "E", the presence of that direct link guarantees that none of these shortest paths will traverse node "A". Accordingly, partitions "D" and "E" can be merged into a single super-partition "DE" for the purpose of the computations at "A".

This process of identifying shorter paths between pairs of root nodes in the pair of partitions or super-partitions under consideration, and merging partitions whenever a sufficient number of shorter paths is found, can be repeated until either: all of the partitions have been merged into a one super-partition (which in fact encompasses the entire network except node "A"); or there are no more pairs of partitions for which all the root nodes are interconnected by paths that are shorter than the two-hop paths through node "A". Whether two partitions can be merged can be determined by considering the root nodes in the proposed merged partition. In the simple case of a pair of partitions each having a single root node, the two partitions can be merged if, and only if, the respective root nodes of the two partitions are connected by a shorter path than the two-hop path through node "A". For the more complex case of a partition having one root node and a super-partition having N (where N>1) root nodes, the two partitions can be merged together if none of the shortest paths between the root node of the partition and the N root nodes of the super-partition go through node "A".

Figure 2D:
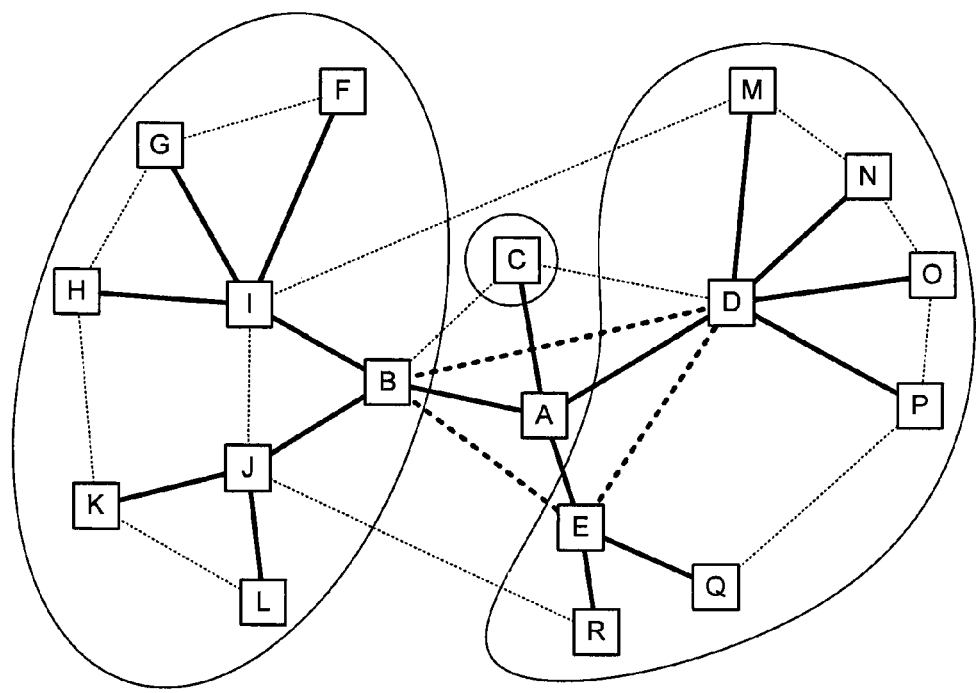

Thus, continuing the example at FIG. 2d, and continuing to use the number of hops as shortest path criteria, the partition "B" can be merged with super-partition "DE" (having N=2 root nodes) to produce super-partition "BDE", because root node "B" is directly connected to the two root nodes of super-partition "DE". This guarantees that there is no shortest path between any pair of nodes in super-partition "BDE" which traverses node "A". On the other hand, and referring to FIG. 2e, partition "C" can not be merged with super partition "BDE", because there is no direct link between root node "C" and root node E of the super partition "BDE". In fact, partition "C" could not be merged with partition "E" or any super-partition including partition "E".

Figure 2E:
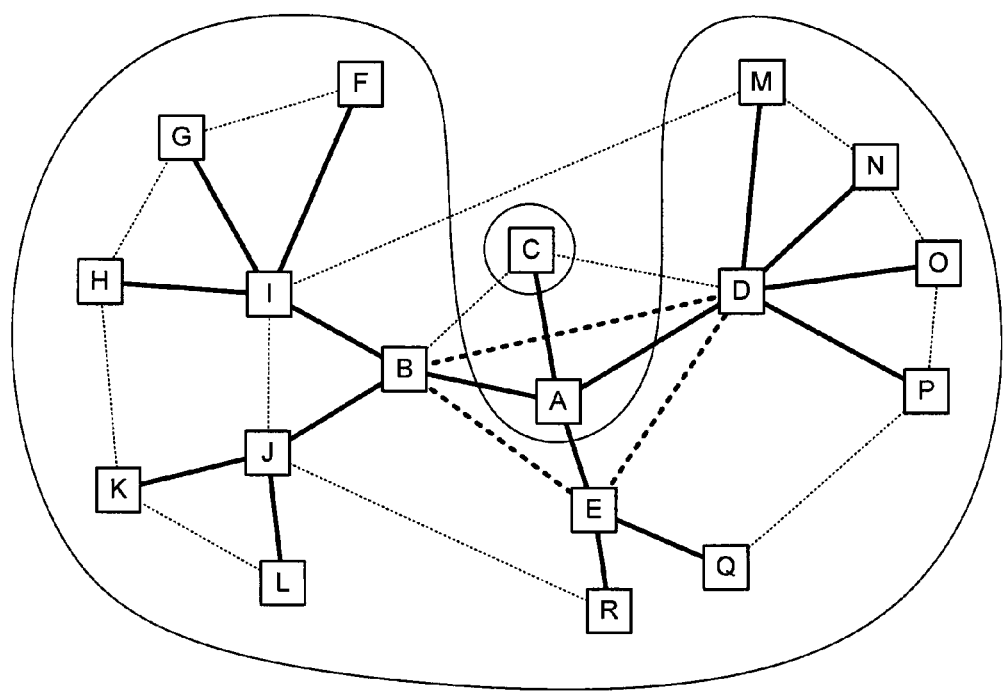

As may be seen in FIG. 2e, completion of the above process of merging partitions results in the network being divided into two partitions, namely partition "C" and super partition "BDE". As noted above, all of the shortest paths of interest can be found by examining the nodes within each partition except the largest partition. In the case of FIG. 2e, all of the shortest paths that traverse node "A" can be discovered by examining node "C" to identify each shortest path extending from node "C" which traverses node "A". As will be appreciated, this dramatically reduces the PLSB computation required for the network in this example, since paths extending from only one node (as opposed to 17 nodes using conventional methods) must be considered.

It will be understood that the benefits obtained by merging partitions is dependent on the network topology. In a scenario in which all partitions can be merged into a single super-partition, which therefore encompasses the entire network, then the number of nodes that must be examined is zero (after the initial overhead of the partitioning step). In a more typical scenario, the process of merging partitions will result in a plurality of partitions and/or super-partitions. In the special case in which node "A" is a dual-connected edge node, the initial number of partitions is two. If these two partitions can be merged successfully, the number of nodes that must be subsequently examined is reduced to zero. Otherwise, in the worst case, the number of nodes that must be examined is slightly less than half the number of nodes in the network, which is still a substantial improvement over conventional methods.

As is known in the art, route computation methods such as Intermediate System-Intermediate System (IS-IS) and Open Shortest Path First (OSPF) and Multicast OSPF can produce multiple equal-cost paths between node pairs. In such cases, the above-described method for merging partitions may be used without modification where either: the "cost" of each path is proportional to the number of hops; or the "cost" of a direct link between two partitions is less than the "cost" of the two-hop path through the node of interest (node "A" in the example of FIG. 2).

A tie-breaking algorithm must be used to select a "shortest" path or subset of shortest paths from among the set of equal-cost paths between a node pair. In such cases, the above-described method for merging partitions can be used, provided that the "shortest" path(s) selected by the tie-breaking algorithm are symmetric and locally consistent.

For example, in the network of FIG. 2, consider a scenario in which the route computation methods yields three equal cost paths between nodes C and E, and a tie-breaking algorithm is used to select one of these equal-cost paths as the "shortest" path. In this case, the above-described methods could be used to merge partition "C" with super-partition "BDE" if the tie-breaking method selected, as the shortest path, either one of the two paths through nodes B or D, but not the path through node "A".

As may be appreciated, this same methodology can be extended to a case where the route computation algorithm computes a set of equal-cost paths, and the tie breaking mechanism operates to select a subset of two or more of these equal cost paths as the shortest paths. In this case, the criterion for merging two partitions is that none of the selected shortest paths traverse the node under consideration. Thus, for example, the tie-breaking mechanism could potentially select any two of the paths between nodes C and E as the set of shortest paths, and the above-described methods could be used to merge partition "C" with super-partition "BDE" if this set of shortest paths did not include the path through node "A".

The embodiment(s) of the invention described above is(are) intended to be exemplary only. The scope of the invention is therefore intended to be limited solely by the scope of the appended claims.

We claim:

1. A method of multicast route computation in a link state protocol controlled network, the method comprising:

computing by a first node of the network a spanning tree from the first node to every other node in the network using a known shortest path tree algorithm;
dividing the network into partitions, each partition encompassing an immediate neighbour node of the first node on the computed spanning tree and any nodes of the network subtending the neighbour node on the computed spanning tree;
merging two or more of the partitions when a predetermined criterion is satisfied;
examining nodes within all of the partitions except a largest one of the partitions to identify node pairs for which a respective shortest path traverses the first node.

2. The method as claimed in claim 1, wherein each one of a first partition and a second partition includes a respective one of the neighbour nodes, and wherein the predetermined criterion is that a shortest path between each of the included neighbour nodes does not traverse the first node.

3. The method as claimed in claim 2, wherein the shortest path is a direct link.

4. The method as claimed in claim 2, wherein the shortest path is selected, from a set of two or more equal cost paths between each of the involved neighbour nodes, by a tie-breaking method which is symmetric and locally consistent.

5. The method as claimed in claim 1, wherein a first partition comprises a respective one of the neighbour nodes and a second partition is a super-partition comprising two or more of the neighbour nodes, and wherein the predetermined criterion is that respective shortest paths between the one neighbour node of the first partition and the two or more neighbour nodes of the second partition, do not traverse the first node.

6. The method as claimed in claim 5, wherein at least one of the shortest paths is a direct link.

7. The method as claimed in claim 5, wherein at least one of the shortest paths is selected from a set of two or more equal cost paths between the one neighbour node of the first partition and one of the two or more neighbour nodes of the second partition by a tie-breaking method which is symmetric and locally consistent.

8. The method as claimed in claim 1, wherein a first partition comprises a respective one of the neighbour nodes and a second partition is a super-partition comprising two or more of the neighbour nodes, the one neighbour node of the first partition being connected to each of the two or more neighbour nodes of the second partition by a respective set of one or more shortest paths, at least one set of shortest paths comprising two or more equal cost paths selected by a tie-breaking method which is symmetric and locally consistent, and wherein the predetermined criterion is that none of the two or more equal cost paths within any given set of shortest paths traverses the first node.

9. A computer software product tangibly embodied on a non-transitive computer readable storage medium, the computer software product implementing a method of multicast route computation in a link state protocol controlled network by controlling a first node of the network to perform the steps of:

computing a spanning tree from the first node to every other node in the network using a known shortest path tree algorithm;
dividing the network into partitions, each partition encompassing an immediate neighbour node of the first node on the computed spanning tree and any nodes of the network subtending the neighbour node on the computed spanning tree;
merging two or more of the partitions when a predetermined criterion is satisfied;

examining nodes within all of the partitions except a largest one of the partitions to identify node pairs for which a respective shortest path traverses the first node.

10. The computer software product as claimed in claim 9, wherein each one of a first partition and a second partition includes a respective one of the neighbour nodes, and wherein the predetermined criterion is that a shortest path between each of the included neighbour nodes does not traverse the first node.

11. The computer software product as claimed in claim 10, wherein the shortest path is a direct link.

12. The computer software product as claimed in claim 10, wherein the shortest path is selected, from a set of two or more equal cost paths between each of the involved neighbour nodes, by a tie-breaking method which is symmetric and locally consistent.

13. The computer software product as claimed in claim 9, wherein a first partition comprises a respective one of the neighbour nodes and a second partition is a super-partition comprising two or more of the neighbour nodes, and wherein the predetermined criterion is that respective shortest paths between the one neighbour node of the first partition and the two or more neighbour nodes of the second partition, do not traverse the first node.

14. The computer software product as claimed in claim 13, wherein at least one of the shortest paths is a direct link.

15. The computer software product as claimed in claim 13, wherein at least one of the shortest paths is selected from a set of two or more equal cost paths between the one neighbour node of the first partition and one of the two or more neighbour nodes of the second partition by a tie-breaking method which is symmetric and locally consistent.

16. The computer software product as claimed in claim 9, wherein a first partition comprises a respective one of the neighbour nodes and a second partition is a super-partition comprising two or more of the neighbour nodes, the one neighbour node of the first partition being connected to each of the two or more neighbour nodes of the second partition by a respective set of one or more shortest paths, at least one set of shortest paths comprising two or more equal cost paths selected by a tie-breaking method which is symmetric and locally consistent, and wherein the predetermined criterion is that none of the two or more equal cost paths within any given set of shortest paths traverses the first node.

* * * * *

UNITED STATES PATENT AND TRADEMARK OFFICE
CERTIFICATE OF CORRECTION

| | | |
|---|---|---|
| PATENT NO. | : 8,005,016 B2 | Page 1 of 1 |
| APPLICATION NO. | : 12/259650 | |
| DATED | : August 23, 2011 | |
| INVENTOR(S) | : Jerome Chiabaut et al. | |

It is certified that error appears in the above-identified patent and that said Letters Patent is hereby corrected as shown below:

Col. 6, Line 53, Claim 9, line 2, delete "non-transitive" and insert therefore --non-transitory--.

Signed and Sealed this
Sixth Day of December, 2011

David J. Kappos
*Director of the United States Patent and Trademark Office*